T. E. C. BRINLY.
Plow-Fender.
No. 19,909.
Patented Apr. 13, 1858.
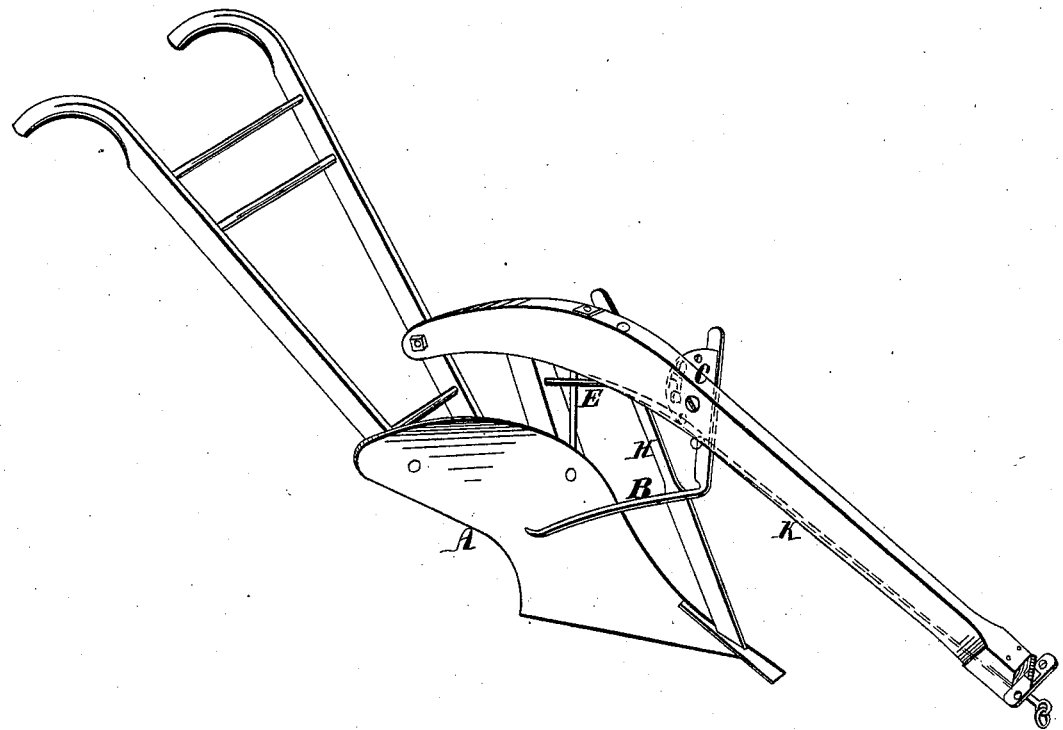

UNITED STATES PATENT OFFICE.

THOS. E. C. BRINLY, OF SIMPSONVILLE, KENTUCKY.

IMPROVEMENT IN PLOWS.

Specification forming part of Letters Patent No. 19,909, dated April 13, 1858.

*To all whom it may concern:*

Be it known that I, THOMAS E. C. BRINLY, of Simpsonville, in the county of Shelby, in the State of Kentucky, have invented new Improvements in Plows; and I do hereby declare that the following is a full and exact description thereof, reference being had to the accompanying drawing, and to the letters of reference marked thereon.

The nature of my invention consists in the cutting out or scalloping the hind part of the mold-board, as represented by letter A in the drawing. The advantage of this improvement is, by cutting it out thereby lessens the draft at least thirty per cent. The front of the plow raises one edge of the furrow-slice, while the other remains on the ground and passes through the scallop in the mold-board. The upper part of the mold-board projects far enough over to invert or lap the furrow-slice. Also, an instrument in the drawing marked B and C. The part C is a piece of cast-iron for screwing the hook B to the beam of the plow and adjusting it. The holes in the hook are for the purpose of raising and lowering it to suit the depths of the furrow. The grass-hook is for the purpose of pulling down tall weeds and grass before the plow, thereby enabling it to run through them without choking while the plow covers them up. Also, the manner in which the cutter H and draft-rod K is attached to the beam. It consists in a brace, E, running through the standard of the plow, with a screw on it to secure it, with a hook on the end, to which the draft-rod K is attached. This brace has a piece attached, which passes through the cutter and screws it to the side of the beam, the brace and draft-rods both being improvements for ease of adjustment and strength of the plow.

What I claim as my invention, and desire to secure by Letters Patent, is—

Grass-hook B and its plate C, when constructed, arranged, and operated with relation to the beam and mold-board of the plow, substantially in the manner and for the purpose herein set forth.

T. E. C. BRINLY.

Witnesses:
J. T. DAVIS,
G. WOOD.